United States Patent
Farrokh et al.

(10) Patent No.: US 6,704,761 B1
(45) Date of Patent: Mar. 9, 2004

(54) CARRY-SAVE MULTIPLIER/ACCUMULATOR SYSTEM AND METHOD

(75) Inventors: Hashem Farrokh, Schnecksville, PA (US); Kalavai J. Raghunath, Chatham, NJ (US); Subramanian Naganathan, Monmouth Junction, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1128 days.

(21) Appl. No.: 08/906,537

(22) Filed: Aug. 5, 1997

Related U.S. Application Data

(63) Continuation-in-part of application No. 08/841,741, filed on Apr. 30, 1997, now abandoned.

(51) Int. Cl.$^7$ .............................. G06F 7/00; G06F 7/52
(52) U.S. Cl. ..................... 708/603; 708/630; 708/551
(58) Field of Search ...................... 364/736.02, 748.03, 364/748.07, 750.5, 757–760.05; 708/550, 551, 523, 501, 603, 620, 625, 628, 629, 630, 632

(56) References Cited

U.S. PATENT DOCUMENTS

| | | | | | |
|---|---|---|---|---|---|
| 4,646,257 A | * | 2/1987 | Essig et al. | ................. | 708/630 |
| 5,195,051 A | * | 3/1993 | Palaniswami | ......... | 364/748.09 |
| 5,268,858 A | * | 12/1993 | Briggs | ................... | 364/760.03 |
| 5,303,178 A | * | 4/1994 | Ozaki | ..................... | 364/760.05 |
| 5,550,767 A | * | 8/1996 | Taborn et al. | ......... | 364/748.04 |
| 5,748,517 A | * | 5/1998 | Miyoshi et al. | ........ | 364/760.01 |
| 5,751,619 A | * | 5/1998 | Agarwal et al. | ....... | 364/736.02 |
| 5,787,029 A | * | 7/1998 | Angel | ........................ | 708/628 |
| 5,790,446 A | * | 8/1998 | Yu et al. | ..................... | 364/757 |

\* cited by examiner

*Primary Examiner*—Chuong Dinh Ngo

(57) ABSTRACT

A method is described for providing an improved multiplier/accumulator which utilizes less processing resources than such devices which are known in the prior art. The methodology operates to utilize the processing resources of a multiplier-accumulator combination on a cooperative basis, with the result that at least one adder stage in such a combination can be eliminated. The method includes the processing by the accumulator of certain terms that would otherwise be processed by the multiplier.

17 Claims, 3 Drawing Sheets

CARRY-SAVE MULTIPLIER/ACCUMULATOR SYSTEM AND METHOD

CROSS REFERENCE TO RELATED APPLICATIONS

This is a continuation in part of Ser. No. 08/841,741 filed Apr. 30, 1997 now abandoned.

This application is related to U.S. patent application Ser. No. 08/906,720, entitled "NEGATION METHOD FOR MACHINE COMPUTATION", (RAGHUNATH-12) now abandoned, said related application being concurrently filed with the present application, having a common inventor, and being incorporated herein by reference.

BACKGROUND OF THE INVENTION

A. Field of the Invention

This application is related to the art of automated processing of numerical data, and more particularly to an improved method for implementing a multiplier/accumulator used in such processing.

B. Background Art

In the art of automated processing of numerical data, as typically carried out in a digital computer, a number of techniques have evolved over the past few decades for reducing the processing time for a given operation, or for accomplishing a given level of processing with lesser hardware complexity, or both. Among such techniques are the use of coding algorithms to effect an encoding of the terms of the multiplier for a given multiplication operation, which encoding results in a material diminution in the number of partial products to be added to find the resultant product of the multiplication, and thus a corresponding savings in the number of adder stages required to find the resultant sum of such partial products. Typical of such coding algorithms is the well-known Booth's algorithm. Artisans in the computer processing arts continue, however, to seek means for further reducing the processing resources required to implement a given computer processing operation.

SUMMARY OF INVENTION

It is accordingly an object of the invention to provide an improved multiplier/accumulator which utilizes less processing resources than such devices which are known in the prior art. To that end, a method is provided for utilizing the processing resources of a multiplier-accumulator combination on a cooperative basis with the result that at least one adder stage in such a combination can be eliminated.

DETAILED DESCRIPTION OF INVENTION

Figure 1:
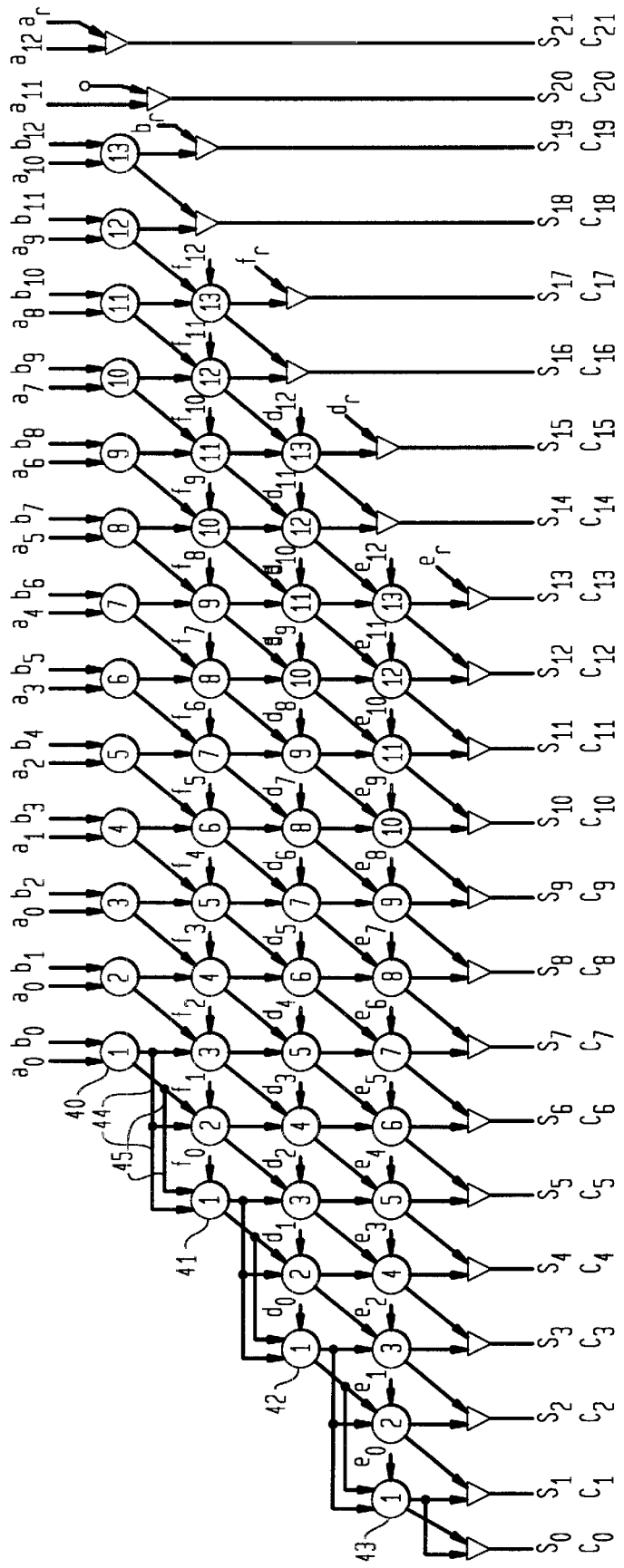
FIG. 1 illustrates in schematic form the carry-save add section of an exemplary 10×12 Booth multiplier implemented to provide a true carry-save output.

The discussion following will be presented partly in terms of algorithms and symbolic representations of operations on data bits within a computer system. As will be understood, these algorithmic descriptions and representations are a means ordinarily used by those skilled in the computer processing arts to convey the substance of their work to others skilled in the art.

As used herein (and generally) an algorithm may be seen as a self-contained sequence of steps leading to a desired result. These steps generally involve manipulations of physical quantities. Usually, though not necessarily, these quantities take the form of electrical or magnetic signals capable of being stored, transferred, combined, compared and otherwise manipulated. For convenience of reference, as well as to comport with common usage, these signals will be described from time to time in terms of bits, values, elements, symbols, characters, terms, numbers, or the like. However, it should be emphasized that these and similar terms are to be associated with the appropriate physical quantities—such terms being merely convenient labels applied to those quantities.

A starting point for any consideration of machine processing of numerical data is a determination of the form in which the data will be presented. To begin, a numbering system must be chosen. Historically, machine processing of numbers has been related to numbers represented in base 2 (binary), 8 (octal), 10 (decimal) and 16 (hexadecimal). Because the binary numbering system has become the overwhelming choice for contemporary machine processing of numerical data, that system will be used herein to illustrate the methodology of the invention. It should, however, be apparent to those skilled in the art that the inventive method can readily be extended to other numbering systems.

Consideration must also be given to the way negative numbers are represented and operated on in the performance of arithmetic operations by the automated processing system. While traditional sign and magnitude representation (i.e., absolute value of the number in question along with a sign indicating whether it is positive of negative, with the positive sign usually being implied) could be used, this representational form is difficult (and expensive) to implement for machine processing. Accordingly, it has become common to use complements of numbers for the arithmetic processes carried out on such an automated basis, along with an additional bit (usually in the most significant bit position) indicative of the sign of the number in question. The means for processing numbers in complement form, as well as the advantages attendant to the use of complements, are well known and will not be discussed further here.

Two kinds of complements are in general use: radix complements and diminished radix complements, where radix refers to the base of the number system being used. For numbers expressed in the binary system, the diminished radix complement is known as the one's-complement and is formed by complementing each bit in the binary number under consideration (i.e., changing all "1" s to "0"s and vice versa). The radix complement in binary is known as the two's-complement, and is formed by adding "1" to the one's-complement of the number. It is known to those skilled in the art that the described methods for forming the one's-complement and the two's-complement are shortcut methods which are largely unique to binary numbers; the theoretical basis for developing such complements for any number system are well known and discussion thereof is not warranted for the explanation here of the methodology of the invention.

Largely because the one's-complement has two representations for the value of zero, and two's-complement has a unique representation of zero, two's-complement representation has become the predominant choice for representing numerical values in machine processing applications. Accordingly, two's-complement representation will be used to illustrate the methodology of the invention and may be considered as being a part of the preferred embodiment of the invention. However, it should be apparent to those skilled in the art of the invention that the methodology disclosed herein may readily be extended to other complementary forms.

The fundamental arithmetic operation carried out for machine processing of numerical data is that of addition, which is implemented in the machine process by a logical device known as an adder. Each adder processes one bit for up to three numerical values to be added. [Note: specialized adders are also known for adding more than three numerical values at a bit position] For more efficient operation, such adders are usually staged in parallel (the number of such parallel adders being at least equal to the number of bits in numbers to be added) with the result that all bits in the numbers being added are processed simultaneously. Such parallel adders must of course deal with the carry from one bit position to another, and a variety of parallel adder configurations have been developed to address this requirement. Among the most notable of such parallel adder configurations are the ripple adder, the carry look-ahead adder, and the carry-save adder. All of these parallel adder configurations are well known in the art and, except for the carry-save adder which forms a part of the preferred embodiment of the invention, will not be discussed further here.

The carry-save adder has been found to provide significant advantage in both processing time and hardware complexity over the ripple adder and the carry look-ahead adder. Accordingly it has become the parallel adder of choice for most machine processing applications. Essentially, the unique feature of the carry-save adder can be described as follows. While other parallel adders must propagate a carry produced by a summation at a bit position through all bits to the left of that bit position, the carry-save adder instead provides two output terms for each set of bits added, a sum term and a carry term. The carry terms for each bit position are sent downward (in parallel and shifted one bit position to the left) to another stage as another n-bit number (n being the number of bits in the numbers being added). The "subtotals" of the sum terms and the carry terms are then added to produce the total for the addition operation. The primary advantage of the carry-save adder is realized in the multiplication operation and will be discussed further in that context.

The operation of multiplication in machine processing (as in paper and pencil processing) is fundamentally that of multiplying each bit in the multiplier by all bits in the multiplicand. [Note: the term "multiplier" will be used herein to connote both a device for carrying out the operation of multiplication and one of the input terms for such a multiplication operation. To avoid possible confusion, all references herein to "multiplier" as an input term will be shown in italics. For consistency, references to the other input term, "multiplicand", will also be shown in italics].

For numbers expressed in the binary system, each bit will be either a "1" or a "0", and thus the partial products corresponding to each multiplier bit will have a "0" in each bit position when the multiplier bit is "0", and will have the same value as each bit of the multiplicand (either "1" or "0") when the multiplier bit is "1". Those partial products, which are of course shifted one bit position to the left for each bit in the multiplier processed, are then added to arrive at the product for the multiplication of the multiplicand and the multiplier. With the use of carry-save adders, each summation of a partial product and a preceding term will be expressed in carry-save format (i.e., each bit position will have both a sum term and a carry term). The carry and sum terms are added in parallel through all of the partial products and the product of the multiplication is determined as a "grand total" of the total of the sum terms through all partial products and the total of the carry terms through all partial products (shifted one bit to the left relative to the sum total). It has been found that application of the carry-save method for addition of the partial products in such multiplication operations results in considerable savings in processing time. Accordingly, this method is commonly used for the multiplication operation in machine processing.

It is well known that, for machine implemented multiplication, reduced processing time may be achieved by a reduction in the number of partial products which must be added for the multiplication of a given multiplicand and multiplier. Various algorithms have been developed to exploit characteristics of the representational form and/or the multiplication process to achieve such a goal. Simple examples of such algorithms are: (1) the skipping of the step of producing a partial product for a "0" in the multiplier and shifting the next partial product by two bit positions—thus eliminating a row of bit adders, along with the attendant savings of processing time, for each partial product skipped—and (2) looking for strings of "0"s, with corresponding multiple shifts for the next partial product.

More sophisticated algorithms are also known for reducing the number of partial products for a given multiplication by operating on groupings of bits in the multiplier and providing an encoded multiplier based on values determined from such groupings—as exemplified by the well known Booth's algorithm. With Booth's algorithm, as well as with others of the genre, the encoded multiplier will contain fewer bits than the original multiplier, and thus produce fewer partial products. [Note: although the values represented in the encoded multiplier may be numerically other than a "1" or a "0", as described hereafter for a "modified Booth algorithm", each such encoded value will be referred to herein as a "bit."]

With Booth-type encoding, each non-zero bit in the encoded multiplier will have a plus or minus sign associated with that bit position in the multiplier. In forming the partial products for that encoded multiplier, the negative of the multiplicand will form the partial product for any such non-zero bit having a minus sign. A modified form of Booth's algorithm has also been developed which continues the encoding of the multiplier as described above, and also causes some of the bits in the encoded multiplier to be translated into plus or minus two times the value of the multiplicand when that multiplier term is applied to form a partial product. With such a modified Booth algorithm, the number of partial products developed from the encoded multiplier is never greater than one-half the number of such partial products which would have been associated with a straight bit-by-bit application of the non-coded multiplier. [Note: other coding algorithms have been developed which provide partial products equal to three or more times the multiplicand, but such algorithms have not to this point gained wide acceptance.] All of these encoding algorithms are well known to those skilled in the art of the invention. For a more detailed treatment of such algorithms, see, e.g., Koren, *Computer Arithmetic Algorithms*, pp. 99–106, Prentice Hall, 1993 or Hamacher, Vranesic and Zaky, *Computer Organization*, pp. 257–264, McGraw-Hill, 1984, which supporting references are hereby incorporated by reference.

In the parent case to this application, a novel carry-save multiplier is disclosed having an output in true carry-save form. The adder stage configuration for a 10×12, Booth-encoded, carry-save multiplier carrying out the method of the invention in the parent case (and having such a true carry-save output) is illustrated in FIG. 1, which is a reproduction of FIG. 3 of the parent case. [Note: the reference designators shown in the figure relate to the methodology of the parent-case invention for providing a true carry save output from such a multiplier, that method and its relationship to such designators being fully explained in the parent-case application]

As will be apparent from FIG. 1, there are 5 partial products produced by the Booth encoding for this illustrative 10×12 multiplier, which partial products are designated $a_0$, $a_1, \ldots a_{12}$; $b_0, b_1, \ldots b_{12}$; $f_0, f_1, \ldots f_{12}$; $d_0, d_1, \ldots d_{12}$; and $e_0, e_1, \ldots e_{12}$. (It is noted that for this and subsequent figures, the convention is followed of designating the most significant bit (MSB) with a "0" subscript, that bit also being the sign bit, and the least significant bit (LSB) with a subscript corresponding to the highest numbered bit in the multiplicand—here "12".) The Booth encoding also produces a round bit linked to each partial product, which round bits are shown in the figure with an "r" subscript.

Each of the circles in the figure represents a bit adder and the inputs to those bit adders (corresponding to the bits of each of the Booth encoded partial products) are shown by arrows terminating at each bit adder and labeled with the corresponding partial product bit (using the nomenclature described above).

The present invention is directed to a cooperative combination of a computer implemented multiplier and an associated accumulator. For a preferred embodiment of the method of the invention, the pure carry-save multiplier constructed according to the method of the invention in the parent case and illustrated in FIG. 1 will be used to represent the multiplier portion of such a multiplier-accumulator combination. It should, however, be understood that the inventive methodology can readily be extended to other multiplier configurations.

An accumulator operates to add (or subtract) a new value to (or from) a value previously stored by the accumulator and replace that stored value with such sum (or difference). Algebraically, the function carried out by the accumulator can be described as:

$$X+P=Y.$$

where X represents the value previously stored by the accumulator, P represents the new value to be added or subtracted, and Y represents the sum or difference which will then be stored by the accumulator, replacing the previously stored value, X. In the case where the numerical values being operated on are expressed in carry-save form, the accumulator will store both the carry and the save term for the original value and will provide the addition or subtraction operation for both the carry and save terms of the new value. Algebraically:

$$X_C, X_S \pm P_C, P_S = Y_C, Y_S$$

where the "C" and "S" subscripts indicate the carry and save terms, respectively, for each value.

Figure 2:
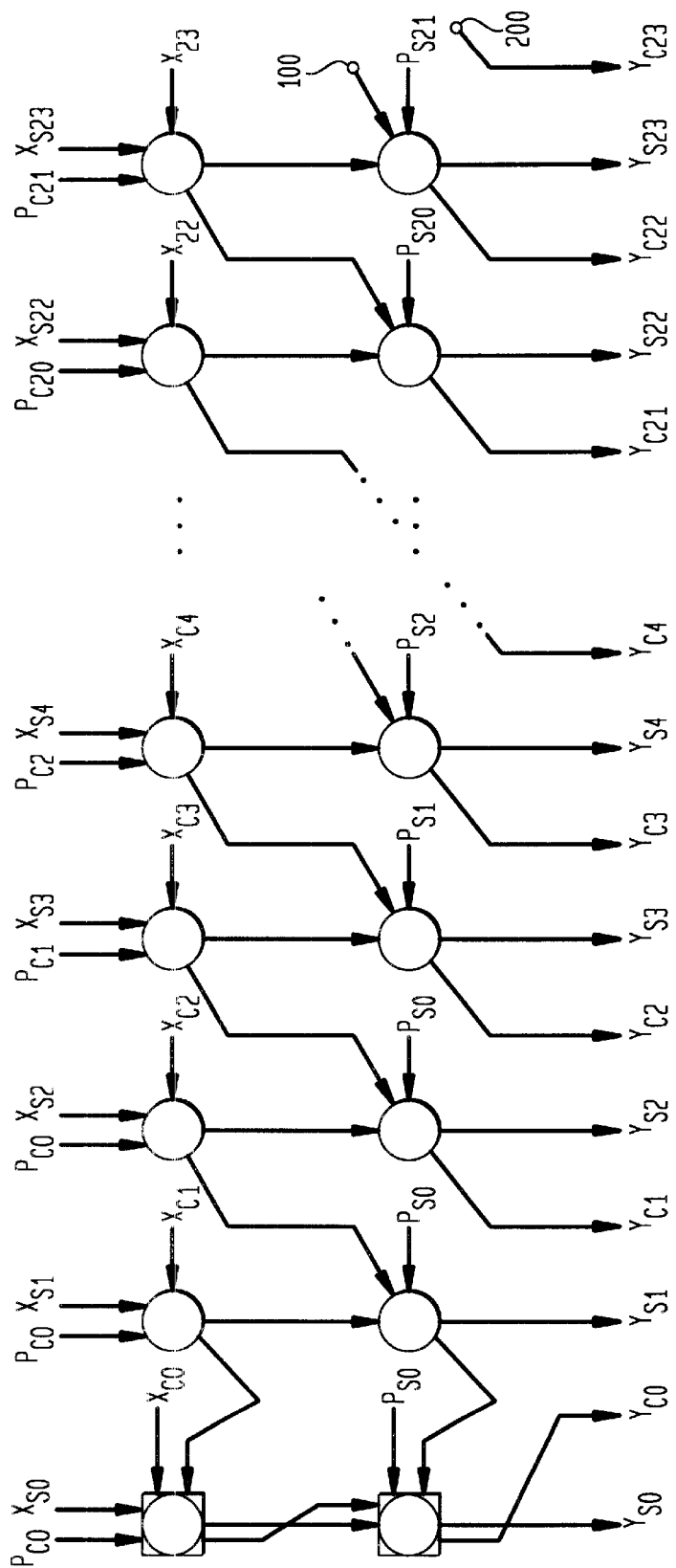
FIG. 2 shows schematically a typical carry-save accumulator.

In practice, an accumulator will typically contain a register for storing the original value and replacement values created by operation of the accumulator, and at least one adder stage for carrying out the addition or subtraction of the new value. For the case of values represented in carry-save form two registers are required (or a double length register) for independently storing the carry and save terms and at least two adder stages are required for the addition operation of the accumulator. FIG. 2 provides a schematic illustration of the adder stages associated with an accumulator for processing values in carry save form. Consistent with the nomenclature above, the value of each bit position of the stored value is indicated by $X_{S_n}$ (sum term) and $X_{C_n}$ (carry term), wherein represents the bit position—n=0 to N−1 (N being the total number of bits which can be processed and stored by the accumulator). Similarly, the value to be added or subtracted is indicated by $P_{S_n}$ and $P_{C_n}$, and the resultant value, which is to replace the previously stored value, by $Y_{S_n}$ and $Y_{C_n}$. For the illustrated case, N is equal to 24, which is the length of the expected product term from the carry-save multiplier illustrated in FIG. 1 that is intended to provide the new value for the accumulator in the described embodiment.

For the accumulator illustrated in FIG. 2, each of the bit adders in each adder stage (indicated by circles in the figure), but for the MSB adder (indicated by a circle enclosed by a square), is a conventional full adder which adds up to three input terms and produces two output terms. For the MSB position in each adder stage, a specialized adder is used which adds four input terms and produces two output terms. Note that in the normal operation of the accumulator, the inputs designated as 100 and 200 at the LSB position of the adder stages are set to zero.

The method of the invention proceeds from the recognition by the inventors that, but for the necessity to process the Booth encoding "round" bit for the second partial product of the encoded Booth multiplier, indicated as "$b_r$" in the multiplier depicted in FIG. 1, one stage of adders in such a multiplier could be eliminated, specifically the second adder stage of the multiplier illustrated in FIG. 1 (where the $f_n$ partial product bits are added to the sum and carry outputs of the previous adder stage). The inventors have also recognized that this Booth round bit can be eliminated from the processing of the multiplier adder stages and instead added at the LSB position for each of the adder stages of a carry-save accumulator to produce exactly the same resultant for an addition of the multiplier product to that accumulator.

Figure 3:
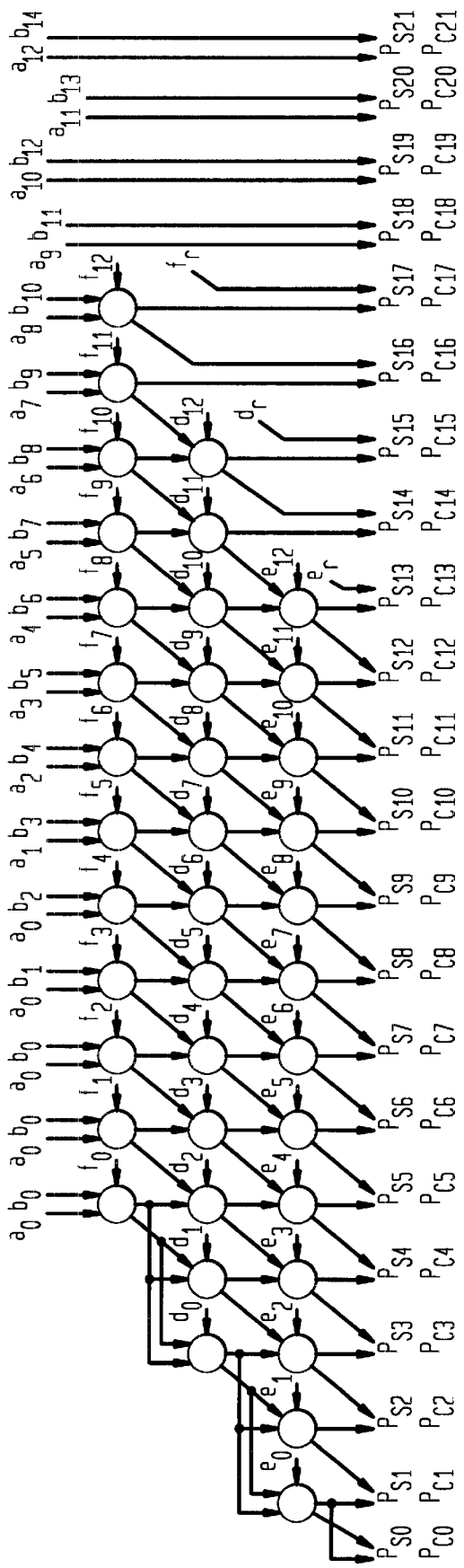
FIG. 3 shows schematically the carry-save add section of a 10×12 Booth multiplier implemented according to the method of the invention.

With reference again to the accumulator depicted in FIG. 2, it was noted previously that, for the normal operation of the accumulator, the inputs depicted at 100 and 200 are set to zero—i.e., those inputs are not used. With the recognition by the inventors that the indicated Booth round bit may be added to the LSB position of each adder stage for such a carry-save accumulator in lieu of processing by a multiplier whose product is added to the accumulator, these unused inputs provide an opportunity to implement such a cooperative interworking of the multiplier and the accumulator with a resultant savings of a full adder stage in the multiplier. Such a reconfigured multiplier is depicted in FIG. 3. It is to be emphasized that the multiplier shown in FIG. 3 carries out exactly the same 10×12 multiplication as the multiplier shown in FIG. 1, and that all of the partial product terms are processed in a normal manner except for the Booth round bit designated as $b_r$ which is processed in the accumulator according to the method of the invention. And, as can be seen in the figure, the 10×12 multiplier reconfigured according to the method of the invention requires only three adder stages, while the multiplier shown in FIG. 1 requires four such stages.

As previously noted, the Booth encoding for the illustrative 10×12 multiplier depicted in FIGS. 1 and 3 produces an encoded multiplier having 5 terms, and thus 5 partial products are formed for this multiplier. From this, it will be apparent that the method of the invention, which requires only 3 multiplier stages for processing these illustrative 5 partial products (as shown in FIG. 3), permits a multiplier to be implemented with a number of adder stages equal to two less than the number of partial products to be processed.

While the previously described method for a cooperative interworking of a multiplier and an accumulator works well for products of the multiplication to be added to the accumulator, a problem arises in the case of such a product being subtracted from the accumulator. In that case the normal process would be to form the two's complement of that product and add it to the accumulator. However, to form that two's complement, the individual bits of the carry and sum terms must be complemented and a "1" added at the LSB position for each resultant. This added "1" at the LSB position would normally be added using the otherwise unused inputs 100 and 200 of the accumulator shown in FIG. 2. However, these inputs are used to add the Booth round bit to the accumulator pursuant to the method of the invention.

This problem is solved by use of the negation method described in the cross-referenced, concurrently-filed related application, RAGHUNATH-12. According to that method, the product of a multiplier using Booth (or similar) encoding can be caused to be represented as a two's complement of the actual product by effecting a sign reversal for each of the terms of the Booth-encoded multiplier. Thus, according to the method of the invention here, such a sign reversal is carried out for any multiplication operation whose product is intended to be subtracted from the accumulator.

Conclusion

A method for effecting a cooperative interworking of a computer-implemented multiplier and an accumulator, with a material savings of processing resources, has been disclosed and described. With the methodology of the invention, one bit from a multiplier encoding process (known as a round bit for the Booth encoding of the preferred embodiment) is eliminated from the processing carried out by the multiplier and operated on directly by an accumulator to which the product of that multiplication is to be added without affecting the ultimate resultant at the accumulator. A full adder stage is eliminated from the multiplier through such cooperative interworking.

Although the present embodiment of the invention has been described in detail, it should be understood that various changes, alterations and substitutions can be made therein without departing from the spirit and scope of the invention as defined by the appended claims. In particular, while the methodology of the invention has been described in terms of a preferred embodiment using a two's-complement, carry-save multiplier using Booth encoding, the method can readily be extended to other implementations.

What is claimed is:

1. A method for cooperatively combining a computer-implemented multiplier and an accumulator established to receive an output of said multiplier comprising the steps of:
   causing an input term of said multiplier to be coded according to an algorithm for reducing a number of partial products generated by operation of said multiplier;
   configuring adder stages of said multiplier for summing said partial products so that all partial product bits except for at least one round bit are processed in a set of adders comprising said adder stages;
   causing said at least one round bit to be processed by said accumulator; and
   causing an output of said multiplier to be provided as an input to said accumulator.

2. The method for combining a multiplier and an accumulator of claim 1 wherein said coded input term is represented as a plurality of bits and each of a subset of said bits has a sign associated therewith, and including the further step of causing a sign associated with each of said signed bits to be changed to an opposite sign when said output of said multiplier is to be subtracted from said accumulator.

3. The method for combining a multiplier and an accumulator of claim 1 wherein said coding of said input term is carried out according to a Booth encoding algorithm.

4. The method for combining a multiplier and an accumulator of claim 1 wherein said multiplier is implemented as a carry-save multiplier.

5. The method for combining a multiplier and an accumulator of claim 4 wherein said carry-save multiplier provides an output in pure carry-save form.

6. A processor configured to include at least one multiplier and one accumulator established to carry out the method of claim 1 for cooperative combination of said multiplier and said accumulator.

7. The processor of claim 6 implemented as a digital signal processor.

8. The processor of claim 6 implemented as a general purpose computer.

9. A storage medium configured to include a computer program for carrying out the method of claim 1.

10. A storage medium fabricated to include a set of instructions for carrying out the method of claim 1.

11. In an automated numerical processing system including at least one multiplier and at least one accumulator, a cooperative combination of at least one of said multipliers and at least one of said accumulators, said cooperative combination established according to the following steps:
    causing an input term of said cooperative multiplier to be encoded according to an algorithm for reducing a number of partial products generated by operation of said multiplier;
    configuring adder stages in said cooperative multiplier for summing said partial products so that all partial product bits except for at least one round bit are processed in a set of adders comprising said adder stages;
    causing said at least one round bit to be processed by said cooperative accumulator; and
    causing an output of said cooperative multiplier to be provided as an input to said cooperative accumulator.

12. The cooperative multiplier-accumulator combination of claim 11 wherein said coded input term is represented as a plurality of bits and each of a subset of said bits has a sign associated therewith, and including the further step of causing a sign associated with each of said signed bits to be changed to an opposite sign when said output of said multiplier is to be subtracted from said accumulator.

13. A machine implemented multiplier comprising:
    means for causing an input term to be encoded according to an algorithm for reducing a number of partial products generated by operation of said multiplier, said encoded input term including a plurality of bits;
    means for causing each of said plurality of bits in said input term to be multiplied by a second input term to form a corresponding number of said partial products;
    a plurality of adder stages for finding a sum of said corresponding number of said partial products;

wherein said plurality of adder stages is configured such that a numeric count of aid plurality of adder stages is at least two less than a numeric count of said corresponding number of said partial products; and further wherein at least one part of said encoded input term is processed by an accumulator cooperatively linked with said multiplier.

14. The multiplier of claim 13 wherein said coding of said input term is carried out according to a Booth encoding algorithm.

15. The multiplier of claim 13 wherein said at least one part of said encoded input term processed by said companion device includes a Booth round bit.

16. A method for cooperatively combining a computer-implemented multiplier and an accumulator established to receive an output of said multiplier comprising the steps of:

causing an input term of said multiplier to be coded according to an algorithm for reducing a number of partial products generated by operation of said multiplier;

selecting at least one round bit associated with said generated partial products to be processed separately from said partial products;

configuring a set of adder stages of said multiplier for summing said partial products, excepting said selected at least one round bit;

causing an output of said multiplier to be provided as an input to said accumulator; and providing said selected at least one round bit as a separate input to said accumulator, wherein said inputted round bit and said multiplier output are processed by an adder stage of said accumulator.

17. In an automated numerical processing system including at least one multiplier and at least one accumulator, a cooperative combination of at least one of said multipliers and at least one of said accumulators, said cooperative combination established according to the following steps:

causing an input term of said cooperative multiplier to be encoded according to an algorithm for reducing a number of partial products generated by operation of said multiplier;

selecting at least one round bit associated with said generated partial products to be processed separately from said partial products;

configuring a set of adder stages in said cooperative multiplier for summing said partial products, excepting said selected at least one round bit;

causing an output of said cooperative multiplier to be provided as an input to said cooperative accumulator; and providing said selected at least one round bit as a separate input to said cooperative accumulator, wherein said inputted round bit and said multiplier output are processed by an adder stage of said cooperative accumulator.

* * * * *